United States Patent [19]

Chapman

[11] 4,230,632
[45] Oct. 28, 1980

[54] PREPARATION OF HEAT STABLE SILICONE FLUIDS

[75] Inventor: Dwain R. Chapman, Adrian, Mich.

[73] Assignee: SWS Silicones Corporation, Adrian, Mich.

[21] Appl. No.: 18,215

[22] Filed: Mar. 7, 1979

[51] Int. Cl.³ ............................ C07F 7/08; C07F 7/18
[52] U.S. Cl. .................................. 556/401; 556/450; 556/453
[58] Field of Search ................................. 260/448.2 S

[56] References Cited

U.S. PATENT DOCUMENTS 2,389,802  11/1945  McGregor et al. ............ 260/448.2 S
3,955,985   5/1976  Bosch et al. .................... 260/448.2 S

*Primary Examiner*—Paul F. Shaver

[57] ABSTRACT

Heat stable silicone fluids are prepared by adding to silicone fluids from 10 to 50 percent by weight of an aminofunctional silicone fluid based on the total weight of the composition. The resultant composition is stable at temperatures above 400° F. for more than 300 hours.

8 Claims, No Drawings

PREPARATION OF HEAT STABLE SILICONE FLUIDS

The present invention relates to heat stable silicone fluids and more particularly to a process for preparing heat stable silicone fluids.

BACKGROUND OF THE INVENTION

Compositions containing organopolysiloxane fluids and aminofunctional silicone fluids as release agents are known in the art. For example U.S. Pat. Nos. 3,883,628 and 4,078,104 to Martin disclose release compositions for polyurethanes and bituminous materials containing an organopolysiloxane fluid and from 0.1 to 90 percent by weight based on the total weight of the composition of an aminofunctional silicone fluid.

Also, U.S. Pat. No. 38,938 to Koda et al describes methods for improving the heat stability of organopolysiloxane fluids by incorporating therein certain inorganic salts of metals such as iron, zirconium, cerium, manganese and nickel. Since these metals or metal salts are not compatible with the organopolysiloxane fluids, they were difficult to disperse uniformly throughout the composition. Other compositions which have been used to improve the heat stability of organopolysiloxane fluids are those obtained from the reaction of a cerium salt of an organic carboxylic acid and an alkali metal siloxanolate having at least three organosiloxane units per molecule.

Although the metal salts improve the heat stability of the silicone fluids, many of these metal salts are difficult to disperse therein in order to obtain a uniform dispersion. Another disadvantage of using metal salts to improve the heat stability of silicone fluids is that they are not all readily available. In contrast to the use of metal salts, as a heat stabilizer, the aminofunctional silicone fluids of this invention are readily available and they are compatible with the silicone fluids.

Therefore, it is an object of this invention to provide silicone fluids having improved heat stability. Another object of this invention is to provide silicone fluids containing a heat stabilizing agent that is easily dissolved therein. A further object of this invention is to provide a method for preparing silicone fluids having improved heat stability.

SUMMARY OF INVENTION

The foregoing objects and others which will become apparent from the following description are accomplished in accordance with this invention, generally speaking, by providing a method for preparing silicone fluids having improved heat stability which comprises adding from 10 to 50 percent by weight of an aminofunctional silicone fluid to from 90 to 50 percent by weight of an organopolysiloxane fluid. The resultant composition is stable at a temperature of 400° F. for more than 300 hours.

DETAILED DESCRIPTION OF INVENTION

Silicone fluids which may be stabilized in accordance with this invention are organopolysiloxanes fluids having the general formula

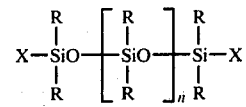

wherein the R(s), which may be the same or different, represent monovalent hydrocarbon radicals having from 1 to 18 carbon atoms, X represents a monovalent hydrocarbon radical or a radical of the formula OR, wherein R is a monovalent hydrocarbon radical and n is a number greater than 10.

Radicals represented by R above are alkyl radicals, e.g., methyl, ethyl, propyl, butyl, octyl, dodecyl and octadecyl; aryl radicals, e.g., phenyl, diphenyl and naphthyl radicals; alkenyl radicals, e.g., vinyl and allyl radicals; cycloalkyl radicals, e.g., cyclobutyl, cyclopentyl and cyclohexyl; alkaryl radicals, e.g., tolyl, xylyl, ethylphenyl; aralkyl radicals, e.g., benzyl, alpha-phenylethyl, beta-phenylethyl and alpha-phenylbutyl and the like.

Monovalent hydrocarbon radicals represented by X are alkyl radicals having from 1 to 18 carbon atoms such as methyl, ethyl, propyl, butyl, hexyl, decyl, dodecyl and octadecyl radicals; aryl radicals such as phenyl, diphenyl and naphthyl radicals and alkenyl radicals such vinyl and allyl radicals. Other groups represented by X are radicals of the formula OR, in which R represents a monovalent hydrocarbon radical having from 1 to 18 carbon atoms.

The organopolysiloxane fluids which are thermally stabilized in accordance with this invention may be either linear or branched chained siloxanes having an average of from 1.75 to 2.25 organic radicals per silicon atom. These organopolysiloxane fluids may have a viscosity of from 5 to 1,000,000 cs. at 25° C. and more preferably from 20 to 300,000 cs. at 25° C. Also, it is possible to blend high and low viscosity fluids to form a fluid having the desired viscosity range.

Examples of suitable organopolysiloxane fluids which may be combined with aminofunctional silicone fluids to improve their thermal stability are triorganosiloxy end-blocked organopolysiloxanes such as trimethylsiloxy end-blocked polydimethylsiloxanes, triethylsiloxy end-blocked polydiethylsiloxanes, hydrocarbonoxy terminated organopolysiloxanes, and copolymers having dimethylsiloxane units and diphenyl siloxane units or methylphenyl and dimethylsiloxane units. Preferably the organopolysiloxanes are trimethylsiloxy end-blocked polydimethylsiloxanes. These organopolysiloxane fluids are well known in the art and consist predominately of diorganosiloxane units ($R_2SiO$).

The aminofunctional silicone fluids employed in this composition may be prepared by mixing an organopolysiloxane with aminofunctional silanes, or siloxanes and thereafter equilibrating the mixture in the presence of an equilibration catalyst. Organopolysiloxanes which may be used in the preparation of these aminofunctional silicone fluids are cyclic siloxanes of the general formula

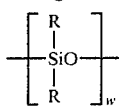

or linear or branched organopolysiloxanes having the general formula $$R_y SiR_z O_{4-y-z/2}$$

in which R is the same as R above, y is a number of from about 0.5 to 3, z is a number of from 0.001 to 1 and the sum of y and z is a number of from 1 to 3 and w is a number of from 3 to 10.

Examples of suitable cyclic organopolysiloxanes which may be used in the formation of these aminofunctional silicone fluids are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane and the like. Cyclic siloxanes in which w has a value of from 3 to 4 are preferred.

Examples of linear or branched chained siloxanes which may be used are triorganosiloxy end-blocked organopolysiloxanes such as trimethylsiloxy end-blocked dimethylpolysiloxanes, diethylpolysiloxanes, methylphenylpolysiloxanes, diphenylpolysiloxanes and copolymers thereof.

The aminofunctional silanes or siloxanes which are reacted with the organopolysiloxanes may be represented by the general formula

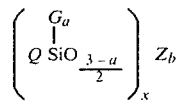

in which G represents the radicals, R, OR′, OR″ NR′$_2$, or OSiR$_3$ in which R is the same as R above, R′ represents hydrogen or monovalent hydrocarbon radicals having from 1 to 18 carbon atoms, R″ is a substituted or unsubstituted divalent hydrocarbon radical having from 1 to 18 carbon atoms, a substituted or unsubstituted divalent hydrocarbonoxy radical in which the oxygen is in the form of an ether linkage or an unsaturated divalent hydrocarbon radical, Q represents the radicals $$R_2'NR''—, R_2'NR''NR''— \text{ and } R_2'NR''OR''—,$$

Z is a radical selected from the group consisting of R′O$_{0.5}$, R$_3$SiO$_{0.5}$ and R′$_2$NR″O$_{0.5}$, in which R, R′ and R″ are the same as above, a is a number of from 0 to 2, b is a number of from 0 to 3 and x is a number of from 1 to 20,000.

Examples of suitable divalent radicals represented by R″ are hydrocarbon radicals having from 2 to 18 carbon atoms such as ethylene, trimethylene, tetramethylene, hexamethylene, octamethylene; hydrocarbonoxy radicals having the formula
(—OC$_2$H$_4$—)$_r$, (—OC$_2$H$_4$OCH—)$_r$ and (—OC$_3$H$_6$—)$_r$
in which r is a number of from 1 to 50 such as ethylene oxide, trimethylene oxide and polymers thereof and alkylene radicals such as vinylene, propenylene, butenylene, hexenylene and the like.

Examples of suitable aminofunctional silanes are beta-aminopropyltriethoxysilane, gamma-aminopropyltrimethoxysilane, methyl-beta-(aminoethyl) gamma-aminopropyldimethoxysilane, omega-aminohexyltributoxysilane, beta-(aminoethoxy)hexyltriethoxysilane, beta-(aminopropoxy)butyltributoxysilane, methyl-beta-(aminopropoxy)propyldi-(aminoethoxy)silane,

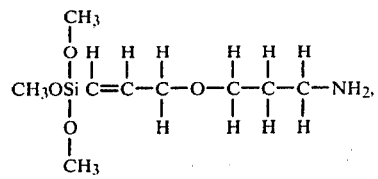

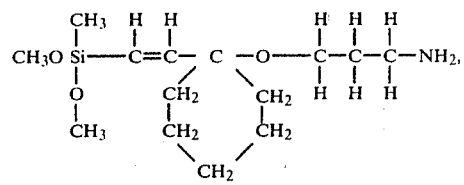

and the like. Representative examples of aminofunctional siloxanes are

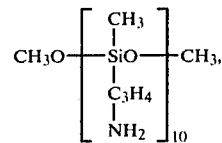

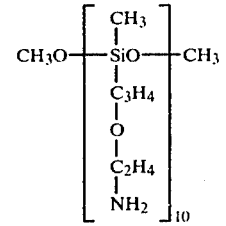

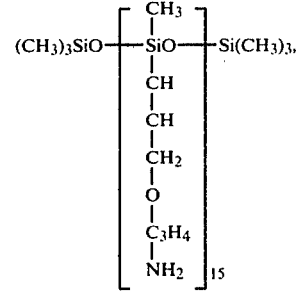

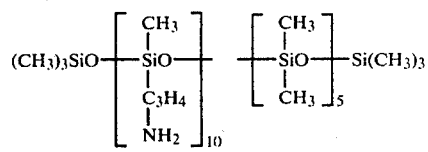

and the like. The aminofunctional silicone fluids and methods for preparing the same are described in U.S. Pat. No. 3,890,269 to Martin, which is incorporated herein by reference.

Other aminofunctional silicone fluids which may be used are tertiary aminoorganosilanes or siloxanes which have at least one ether linkage in the organic group connecting the tertiary amine group to the silicon atoms. The tertiary aminoorganosiloxanes may be represented by the general formula

EXAMPLE 8

An aminofunctional silicone fluid is prepared in accordance with the procedure described in Example 1, except that the mixture also includes 25 parts of hexamethyldisiloxane.

About 30 parts of the resultant aminofunctional silicone fluid are mixed with about 70 parts of a trimethylsiloxy end-blocked polydimethylsiloxane having a viscosity of 60,000 cs. at 25° C. and thereafter heated to 400° F. in an air circulating oven. After 1000 hours, the mixture is still fluid.

EXAMPLE 9

The procedure of Example 1 is repeated except that the aminofunctional silicone fluid is prepared by reacting 9 parts of beta-(aminoethoxy)propyltrimethoxysilane, 316 parts of hexamethylcyclotrisiloxane and 0.3 parts of n-butyllithium at a temperature of about 125° C. The resultant product which is neutralized with 0.3 part of acetic acid has a viscosity of about 125 cs. at 25° C. The ratio of beta-(aminoethoxy)propyl groups to $OCH_3$ groups to $(CH_3)_2SiO$ groups is about 1:3.1:98.

A mixture containing 30 parts of the aminofunctional silicone fluid prepared above and 70 parts of a trimethylsiloxy end-blocked polydimethylsiloxane having a viscosity of 1000 cs. at 25° C., is heated in a 150 ml glass beaker in an air circulating oven at 400° F. After 800 hours, the mixture is still fluid.

EXAMPLE 10

To a mixture containing 129 parts of a hydrosiloxane having the average formula

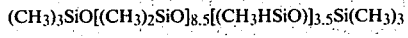

$(CH_3)_3SiO[(CH_3)_2SiO]_{8.5}[(CH_3HSiO)]_{3.5}Si(CH_3)_3$ and 25 parts of platinum per million parts by weight of the reactants as chloroplatinic acid are added dropwise while maintaining the reaction mixture at a temperature of from 150° to 158° C., about 71 parts of an allyl ether of N,N-dimethylethanolamine having the formula

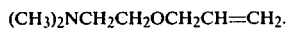

$(CH_3)_2NCH_2CH_2OCH_2CH=CH_2$.

The total time of addition is about 8 minutes. The reaction mixture is heated at 150° C. for an additional 3 hours, then sparged at this temperature for 40 minutes with nitrogen. The resulting product is amber in color and has a viscosity of about 90 cs. at 25° C.

About 30 parts of the aminofunctional silicone fluid is mixed with 70 parts of trimethylsilyl end-blocked polydimethylsiloxane fluid having a viscosity of 1000 cs. at 25° C. and heated in an air circulating oven at 400° F. After about 800 hours, the mixture is still fluid.

COMPARISON EXAMPLE V₃

An aminofunctional silicone fluid is prepared by mixing 30 parts of a silanol chain-stopped polydimethylsiloxane of the formula

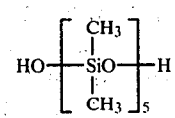

with 7.5 parts of 3-(3-aminopropoxy)propyltrimethoxysilane and about 12 parts of gamma-aminopropyltrimethoxysilane. The reaction mixture is thoroughly agitated and then 0.35 part of water is added with agitation. The resulting organopolysiloxane copolymer has a viscosity of about 150 cs. at 25° C.

About 30 parts of the aminofunctional silicone fluid is mixed with 70 parts of a trimethylsiloxy end-blocked polydimethylsiloxane fluid having a viscosity of 4000 cs. at 25° C. and heated in an air circulating oven at 400° F. The fluid mixture gelled after being heated for 24 hours at 400° F.

What is claimed is:

1. A method for preparing a heat stabilized silicone fluid which comprises adding to a silicone fluid having the general formula

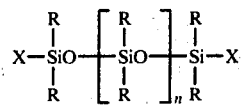

in which R is a monovalent hydrocarbon radical having from 1 to 18 carbon atoms, X is a radical selected from the group consisting of a monovalent hydrocarbon radical and a radical of the formula —OR, where R is a monovalent hydrocarbon radical having from 1 to 18 carbon atoms and n is a number greater than 10, an aminofunctional silicone fluid in an amount of from 10 to 50 percent by weight based on the total weight of the silicone fluid and the aminofunctional silicone fluid, said aminofunctional silicone fluid is a tertiary aminoorganosiloxane of the formula

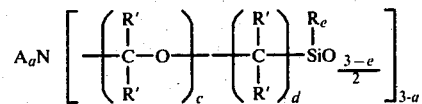

where A is selected from the group consisting of monovalent hydrocarbon radicals having from 1 to 18 carbon atoms, hydroxy terminated polyalkylenoxy groups, alkenyloxy terminated polyalkyleneoxy groups, hydroxyalkyl groups, tertiary aminoalkyl groups and divalent groups which together with the nitrogen atom forms a heterocyclic ring containing only carbon and nitrogen, with hydrogen as the only substituent on the ring or only carbon, nitrogen and oxygen with hydrogen as the only substituent on the ring, R is a monovalent hydrocarbon radical having from 1 to 18 carbon atoms, R' is selected from the group consisting of hydrogen and monovalent hydrocarbon radicals having from 1 to 18 carbon atoms, a is a number of from 0 to 2, c and d are each numbers of from 1 to 10 and e is a number of from 0 to 2, said tertiary aminoorganosiloxane is obtained from a platinum catalyzed addition reaction of an alkenyl ether of a tertiary hydroxyalkylamine and a silicon compound selected from the group consisting of silanes and siloxanes containing silicon bonded hydrogen.

2. The method of claim 1 wherein the aminofunctional silicone fluid is obtained from the equilibration of an organopolysiloxane and an aminofunctional silane or siloxane in the presence of a base catalyst.

3. The method of claim 2 wherein the organopolysiloxane used in the preparation of the aminofunctional silicone fluid is represented by the formula

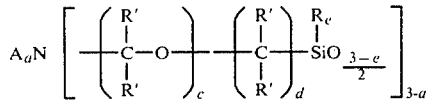

in which A is a monovalent hydrocarbon radical, a hydroxy terminated polyalkyleneoxy group, an alkenyloxy terminated polyalkyleneoxy group, a hydroxyalkyl group, a tertiary aminoalkyl group or a divalent group which, together with the nitrogen atom forms a heterocyclic ring containing only carbon and nitrogen, with hydrogen as the only substituent on the ring or only carbon, nitrogen and oxygen with hydrogen as the only substituent on the ring, R is a monovalent hydrocarbon radical, R' is a monovalent hydrocarbon radical having from 1 to 18 carbon atoms or hydrogen, a is a number of from 0 to 2, c and d are each number of from 1 to 10 and e is a number of from 0 to 2.

These tertiary aminoorganosiloxanes may be prepared by a platinum catalyzed addition reaction of an alkenyl ether of a tertiary hydroxyalkyl amine and a hydrosilicon compound (i.e., a silane or siloxane containing silicon-bonded hydrogen) in accordance with the procedure described in U.S. Pat. No. 3,402,191 to Morehouse. Generally temperatures of from 100° C. to about 160° C. are preferred and solvents for the reactants (e.g., aromatic hydrocarbons such as ethylene glycol dimethyl ether) can be employed, particularly where the reactants are incompatible and/or it is desired to minimize cross-linking. It is preferred that the addition reaction be conducted under an atmosphere of an inert gas to minimize side reactions.

The aminofunctional silicone fluids are compatible and/or soluble in the organopolysiloxane fluids so that amounts up to 50 percent by weight based on the total weight of the composition of an aminofunctional silicone fluid may be added to an organopolysiloxane fluid. Preferably the amount of aminofunctional silicone fluid ranges from 10 to 50 percent and more preferably from 10 to 30 percent by weight based on the weight of the aminofunctional silicone fluid and organopolysiloxane fluid. Moreover, it was found that as the aminofunctional silicone fluid exceeds 50 percent by weight, the heat stability of the composition over a period of time decreases.

Surprisingly, the composition containing from 10 to 50 percent by weight of aminofunctional silicone fluid and 90 to 50 percent by weight of organopolysiloxane fluid exhibits better heat stability at 400° F. then either of the respective fluids alone. This is somewhat unexpected since aminofunctional silicone fluids gelled in about 20 hours at 400° F.

Due to the compatibility and/or solubility of the aminofunctional silicone fluids, it is much easier to incorporate the aminofunctional silicone fluid in the organopolysiloxane fluid. This, of course, is of particular advantage in commercial operations.

The composition of this invention may be used in an environment where thermally stable fluids are desired, such as heat transfer fluids and as transformer oils.

Various embodiments of this invention are illustrated in the following examples in which all parts and percentages are by weight, unless otherwise specified.

EXAMPLE 1

An aminofunctional silicone fluid is prepared by heating a mixture containing about 266.4 parts of octamethylcyclotetrasiloxane, 22.4 parts of beta-(aminoethyl)-gamma-aminopropyltrimethoxysilane and 0.29 part of potassium hydroxide to a temperature of 145° C. for three hours. After cooling the liquid product to room temperature 0.29 part of acetic acid is added to neutralize the catalyst. The product is filtered and a liquid product having a viscosity of about 40 cs. at 25° C. is recovered. Nuclear Magnetic Resonance (N.M.R.) analysis indicates that the ratio of beta-(aminoethyl)-gamma-aminopropyl to $OCH_3$ to $(CH_3)_2SiO$ groups is about 1:3:36.

About 4 parts of the aminofunctional silicone fluid prepared above is mixed with 36 parts of a trimethylsiloxy end-blocked polydimethylsiloxane having a viscosity of 100 cs. at 25° C. in a 150 ml glass beaker and placed in an air circulating oven at 400° F. The results are shown in the table.

EXAMPLES 2 to 6

The procedure of Example 1 is repeated except that varying amounts of aminofunctional silicone fluid are mixed with varying amounts of trimethylsiloxy end-blocked polydimethylsiloxane having a viscosity of 100 cs. at 25° C. The results of these experiments are shown in the table.

COMPARISON EXAMPLE $V_1$

About 40 parts of the aminofunctional silicone fluid prepared in accordance with Example 1 are placed in a 150 ml glass beaker and heated in an air circulating oven to 400° F. The composition gelled after 20 hours.

COMPARISON EXAMPLE $V_2$

In accordance with the procedure described in Comparison Example $V_1$, 40 parts of a trimethylsiloxy end-blocked polydimethylsiloxane fluid is substituted for the aminofunctional silicone fluid. The composition gelled after being heated at 400° F. in an air circulating oven for 190 hours.

TABLE

| Example No. | Aminofunctional Silicone Fluid, Percent | Polydimethyl-siloxane, Percent | Gellation Time, Hours |
|---|---|---|---|
| 1 | 10 | 90 | 384 |
| 2 | 15 | 85 | 1370 |
| 3 | 20 | 80 | 1872 |
| 4 | 30 | 70 | 1704 |
| 5 | 60 | 40 | 340 |
| 6 | 80 | 20 | 70 |
| Comparison Examples | | | |
| $V_1$ | 100 | — | 20 |
| $V_2$ | — | 100 | 190 |

EXAMPLE 7

The procedure of Example 1 is repeated, except that a trimethylsiloxy end-blocked polydimethylsiloxane having a viscosity of 60,000 cs. at 25° C. is substituted for the polydimethylsiloxane having a viscosity of 100 cs. at 25° C. The resultant composition is still fluid after being heated to 400° F. in an air circulating oven for more than 350 hours.

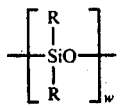

in which R is a monovalent hydrocarbon radical having from 1 to 18 carbon atoms and w is a number of from 3 to 10.

4. The method of claim 2 wherein the organopolysiloxane used in the preparation of the aminofunctional silicone fluid is represented by the formula $$R_y SiR_z O_{4-y-z/2}$$

in which R is a monovalent hydrocarbon radical, y is a number of from about 0.5 to 3, z is a number of from 0.001 to 1 and the sum of y and z is a number of from 1 to 3.

5. The method of claim 2 wherein the aminofunctional silane or siloxane is represented by the formula

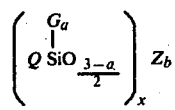

in which G is selected from the group consisting of R, OR', OSiR$_3$ and OR"NR'$_2$ in which R is a monovalent hydrocarbon radical having from 1 to 18 carbon atoms, R' is selected from the group consisting of hydrogen and monovalent hydrocarbon radicals having from 1 to 18 carbon atoms, R" is selected from the group consisting of substituted and unsubstituted divalent hydrocarbon radicals, substituted and unsubstituted divalent hydrocarbonoxy radicals in which the oxygen is in the form of an ether linkage and unsaturated divalent substituted and unsubstituted hydrocarbon radicals, Q is selected from the group consisting of R'$_2$NR"—,

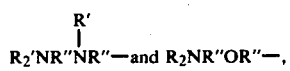

Z is selected from the class consisting of R'O$_{0.5}$, R$_3$SiO$_{0.5}$ and R'NR"O$_{0.5}$, a is a number of from 0 to 2, b is a number of from 0 to 3 and x is a number of from 1 to 20,000.

6. The method of claim 1 wherein the aminofunctional silicone fluid is present in an amount of from 15 to 40 percent by weight based on the total weight of the aminofunctional silicone fluid and the organopolysiloxane fluid.

7. The method of claim 1 wherein the silicone fluid is a trimethylsiloxy end-blocked polydiorganosiloxane.

8. The method of claim 1 wherein the silicone fluid is a hydrocarbonoxy terminated polydiorganosiloxane.

* * * * *